United States Patent [19]

Brock et al.

[11] Patent Number: 5,563,751
[45] Date of Patent: Oct. 8, 1996

[54] LONGITUDINAL BENDING INTERFACE FOR THICK FILM MAGNETIC RECORDING

[75] Inventors: George W. Brock, La Jolla; Wlodzimierz S. Czarnecki, Rancho Santa Fe, both of Calif.

[73] Assignee: Eastman Kodak Company, Rochester, N.Y.

[21] Appl. No.: 437,206

[22] Filed: May 8, 1995

[51] Int. Cl.$^6$ .................................................. G11B 5/48
[52] U.S. Cl. ........................... 360/104; 360/1; 360/3; 360/130.21; 360/130.31; 352/12
[58] Field of Search ............................. 360/3, 1, 130.2, 360/130.21, 130.3, 130.31, 104; 226/58; 354/105, 106, 21; 352/12, 14, 27, 29

[56] References Cited

U.S. PATENT DOCUMENTS

| | | | |
|---|---|---|---|
| 3,852,817 | 12/1974 | Budrose | 360/88 |
| 4,288,825 | 9/1981 | Hasuo et al. | 360/88 |
| 4,933,780 | 6/1990 | Wash et al. | 360/1 |
| 4,947,196 | 8/1990 | Wash et al. | 354/76 |
| 4,996,546 | 2/1991 | Pagano et al. | 354/76 |
| 5,005,031 | 4/1991 | Kelbe | 354/76 |
| 5,016,030 | 5/1991 | Dwyer et al. | 354/21 |
| 5,028,940 | 7/1991 | Pearson | 354/75 |
| 5,034,836 | 7/1991 | DeMarti, Jr. et al. | 360/104 |
| 5,041,933 | 8/1991 | DeMarti, Jr. et al. | 360/104 |
| 5,229,810 | 7/1993 | Cloutier et al. | 355/40 |
| 5,272,498 | 12/1993 | Wakabayashi | 354/105 |
| 5,274,522 | 12/1993 | Taillie | 360/130.3 |
| 5,285,324 | 2/1994 | Weigand et al. | 360/3 |
| 5,285,325 | 2/1994 | Kiesow | 360/3 |
| 5,307,100 | 4/1994 | Kubo | 354/105 |
| 5,321,452 | 6/1994 | Tsujimoto | 354/106 |
| 5,510,864 | 4/1996 | Hill | 360/106 |

FOREIGN PATENT DOCUMENTS

| | | | |
|---|---|---|---|
| 123054 | 4/1992 | Japan | 360/3 |
| 2004680 | 4/1979 | United Kingdom | 360/1 |

Primary Examiner—Aristotelis Psitos
Assistant Examiner—Alan Faber
Attorney, Agent, or Firm—William F. Noval

[57] ABSTRACT

A magnetic read/write head suspension assembly for achieving high magnetic head compliance with at least one edge track of the MOF layer of relatively stiff photographic filmstrips particularly during photofinishing operations. The filmstrip has an emulsion layer side opposite to the MOF layer side and exhibits a positive cross-film curvature toward the emulsion side when unrestrained. Filmstrip edge guides including parallel angled channels extending in a film transport path receive the filmstrip edge regions. One or more magnetic read/write head is mounted in the edge guides with the magnetic head gap length oriented in alignment with the angle of the MOF layer of the filmstrip edge region received in the channel and makes compliant line contact of the magnetic head gap with the MOF layer side in the edge region without imparting drag on the central region of the filmstrip. A backing support member formed of an elastic, deformable reed-shaped backing member trapped in a cavity of the edge guide is thereby biased in relation to the magnetic read/write head to make contact with the emulsion layer side of the filmstrip edge region. Channel angles of a positive 20° to 40° transverse to the direction of film transport plane of the filmstrip may be provided to receive an unrestrained filmstrip exhibiting normal, positive cross-film curvature. Alternatively, the filmstrip may be restrained to exhibit a negative cross-film curvature and directed into channels angled at a negative 3° to 7°. In this case, the backing support may be unnecessary.

11 Claims, 5 Drawing Sheets

LONGITUDINAL BENDING INTERFACE FOR THICK FILM MAGNETIC RECORDING

FIELD OF THE INVENTION

This invention relates to a magnetic record and/or reproduce head suspension assembly for achieving high magnetic head compliance with the magnetics-on-film (MOF) layer of relatively stiff photographic filmstrips particularly during photofinishing operations. In the following description and claims, it will therefore be understood that the terms "magnetic head" and "magnetic read/write head" are defined to encompass active magnetic heads for recording and/or reproducing and/or erasing in magnetic tracks of the MOF layer.

BACKGROUND OF THE INVENTION

In commonly assigned U.S. Pat. No. 5,229,810, incorporated herein by reference, a photographic filmstrip having a virtually transparent, magnetic film layer on the non-emulsion side of the filmstrip (referred to as an MOF layer) is disclosed in conjunction with various camera systems. One or more longitudinal read/write tracks are illustrated in the MOF layer between the side edges of the image frame area and the filmstrip where information such as film type, film speed, film exposure information and information relevant to the processing and subsequent use (e.g., printing) of the exposed image flames is pre-recorded during manufacture of the filmstrip cartridge. The camera disclosed therein is provided with a magnetic read/write head for reading out the pre-recorded information useful for controlling camera operations and for recording of information on certain other film edge tracks during camera use. The information recorded during camera use may include voiced messages or sound associated with the photographed scene and may be recorded in digital or analog format on the certain tracks.

Figure 1:
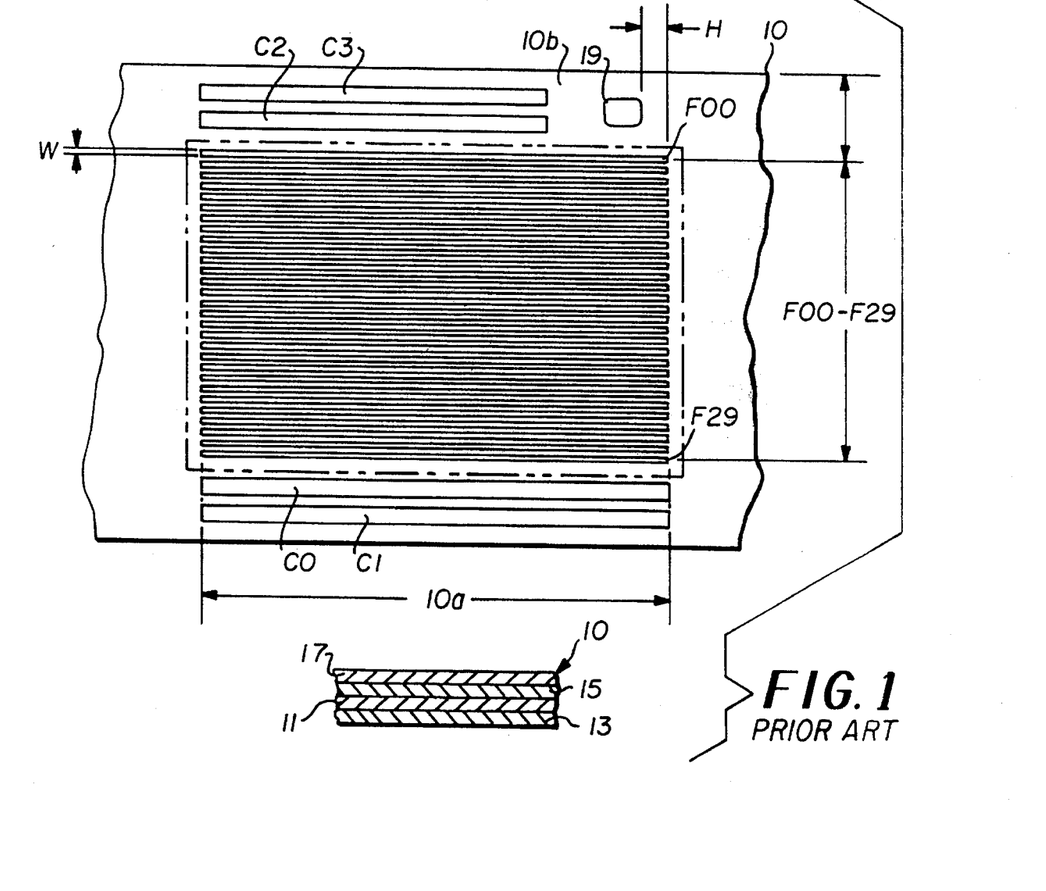
FIG. 1 is a diagram illustrating the parallel dedicated tracks in a virtually transparent MOF layer in a preferred format of the prior art for a filmstrip especially for use in cameras having a magnetic film read/write capability.

Referring now to FIG. 1, the MOF layers on a film strip 10 in which such information may be recorded and from which pre-recorded information may be read out are depicted. The magnetically coated, color negative 35 mm film strip 10 includes a base 11, various well-known photochemical emulsion layers 13 on one side of the base 11 and a virtually transparent MOF layer 15 on the other side. An anti-static and lubricating layer 17 overlies the MOF layer 15. The film strip 10 includes a single perforation 19 along at least one film edge at regular intervals matching the pitch of a metering pawl in a camera adapted to use the film strip 10.

For purposes of recording data in the magnetic layer 15, each frame of the film strip 10 may be formatted as shown in FIG. 1 (as more fully described in the '310 patent, the disclosure of which is incorporated herein by reference). The frame area is divided into a plurality of predetermined longitudinal track locations designated in the drawing as outermost tracks C0–C3 and innermost tracks F00–F29. As described more fully in the '310 patent, certain of the tracks may be reserved for recording of information in the camera using magnetic recording means included in the camera. In addition, other tracks may be reserved for use by the photofinisher, and certain of the tracks may be used for recording of audio information.

In filmstrip 10, first edge tracks C0 and C1 are formed in imperforate edge region 10a and second edge tracks C2 and C3 are formed in perforate edge region 10b. In order to accommodate the presence of the camera tracks C2 and C3 along the edge region 10b, the perforations 19 are spaced to be adjacent the borders of successive image frames. In the embodiment of FIG. 1, there is only one perforation 19 in each frame border along only the edge region 10b. However, it will be understood that two perforations adjacent the beginning and the end of each image frame may be provided in edge region 10b.

In filmstrip 10, the density of the virtually transparent MOF layer 15 is much lower than in typical magnetic tape. Because of the low magnetic density of the MOF layer 15, it is of particular importance that the magnetic read/write head-to-film interface must have high compliance. Because of the MOF layer side and the emulsion side to scratching and damage, it is also important to avoid scratching the MOF layer or the emulsion layers. As a result, extreme care must be taken in the design of the components of the head-to-MOF layer interface and the backing support-to-emulsion interface to ensure that minimal surface damage occurs.

Figures 2, 3:
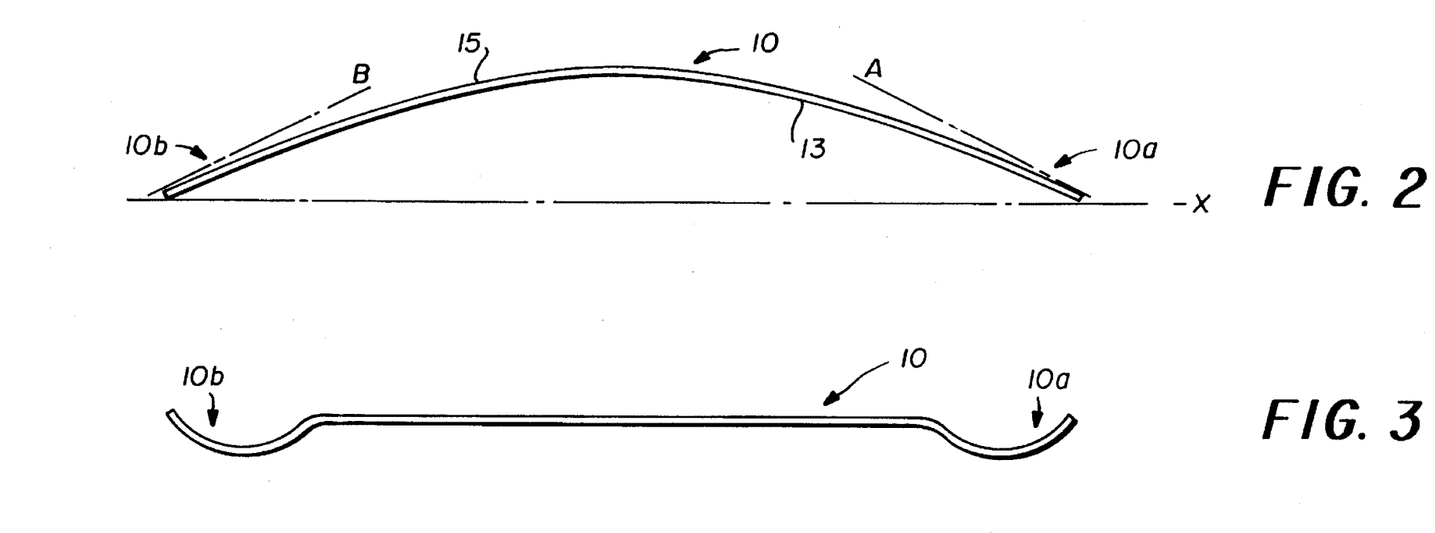
FIG. 2 is a schematic end view of the filmstrip of FIG. 1 showing a typical positive cross-film curvature when the filmstrip is relaxed.
FIG. 3 is a schematic end view of the filmstrip of FIG. 1 showing typical cross-film ear curvature in the edge regions when the filmstrip is flattened.

The photographic filmstrip 10 is of much greater thickness than the magnetic tape used for commercial and consumer recording and reproduction and is neither compliant nor inherently flat. When removed from its cartridge, such a filmstrip has a relatively high stiffness and very observable, positive cross-film curvature across its width that is convex on or toward the filmstrip MOF layer side as shown in the schematic end view illustration of FIG. 2. The positive cross-film curvature or curl is primarily caused by the number of emulsion layers 13 and the MOF layer 15. The emulsion and MOF layers have different stretch properties than that of the base film substrate of acetate, PET, or PEN material. The positive cross-film curvature is also influenced by the bending phenomena known as anticlastic curvature. The degree of positive cross-film curvature also depends on environmental conditions, including the time and temperature history of the film, the relative humidity, and the thickness of the film.

In addition, the unrestrained filmstrip exhibits a curvature along its length, again typically curling in on the filmstrip emulsion side. This lengthwise curl is attributed primarily to a core-set curl that results from the filmstrip having been tightly wound on a film cartridge spool.

In cameras, the cross-film and lengthwise curl of the filmstrip advanced from the cartridge through the exposure gate is flattened, at least in the image frame area, by confining the filmstrip between two edge rails and a platen as shown, for example, in commonly assigned U.S. Pat. No. 4,947,196 (FIG. 3). When the filmstrip is confined in the camera exposure gate, it is forced into an essentially planar surface in the image area to ensure that the captured image is not distorted, and the emulsion side is presented toward the imaging lens and shutter assemblies. The flattening of the filmstrip inside the rails leads to severe edge distortion or "ears" formed at the side edge regions 10a and 10b outside the rails.

FIG. 3 of the present invention shows an example of this edge ear curl in edge regions 10a and 10b which is a function of the degree of bending, humidity, and core set of the filmstrip 10. The cross-film curl of FIG. 3 is for a bend radius of 1.90" and 50% relative humidity. Each perforation 19 can locally distort the adjacent ear shape of the edge region 10b.

Because of the ears, which are a necessary byproduct in the camera environment and also occur when the filmstrip is wrapped around a magnetic head, it is difficult to achieve good contact or compliance across the width of the MOF layer tracks C0–C3 outside the image frame area. To address these problems and concerns, a number of magnetic read/ write head suspensions and backing supports have been proposed for implementation in cameras. Commonly assigned U.S. Pat. Nos. 4,933,780, 4,996,546, 5,005,031, and 5,028,940, and further U.S. Pat. No. 5,307,100 disclose various miniaturized magnetic read/write head and backing support configurations for use in recording and/or reproducing in the longitudinal tracks alongside the filmstrip edges. These patents generally teach shaping the magnetic record/ reproduce head as an arc section of a cylinder centered on the head gap and either flattening the filmstrip MOF layer against the head gap or wrapping the filmstrip MOF layer over the arc section to a slight degree to provide a line contact of the magnetic head gap with the MOF layer. Pressure pad supports or rollers of various configurations bearing against the filmstrip emulsion side opposite from the magnetic head and continuous motion of the filmstrip are taught to provide compliance for recording and/or reproducing information in the edge tracks. In the above-referenced '196 patent, the magnetic read/write head is suspended on a flexure arm to permit a tilt or roll of the magnetic head such that head contact with the curled ears of the filmstrip edge regions is maintained during movement of the filmstrip.

In photofinishing operations, further magnetic read and or write head assemblies are provided in association with a printer or in film preparation work station so that both the pre-recorded and the camera use recorded information will be read out for control and reprint purposes during photofinishing. Also, it is desirable for the photofinisher to have the capability to record additional information related to finishing, e.g. printing exposure conditions, customer information, reorder information, etc. in further tracks. In the photofinishing operations, the filmstrips are first developed, spliced together end-to-end and wound on film supply reels. The length of film is then advanced through a film preparation work station or photographic printer or the like to read out filmstrip information, image frame information and the magnetically recorded information. The filmstrips are advanced through filmstrip edge and image frame scanners for reading out prerecorded film information and image frame information for use in controlling printing operations or the like. In this process, it is important to maintain a steady velocity of the film to avoid scanning errors.

Again, in this case, to provide a reliable read or write signal, the length of the magnetic read and write head gaps must remain in close proximity to the tracks of the MOF layer. Any disturbances, e.g. changes in film curl in the ear region, splices and lateral offsets in the spliced filmstrips, can vary the relationship of the recording head gap to the magnetic coating and decrease the reliability of the signal. Commonly assigned U.S. Pat. Nos. 5,034,836, 5,041,933, 5,274,522, 5,285,324 and 5,285,325 disclose magnetic read/ write head configurations for tracking the film edge tracks particularly for use in such photofinishing equipment. Generally, space constraints are relaxed in the photofinishing context, and the head suspension and backing support systems disclosed therein are bulkier than can be employed in cameras. These patents generally also teach shaping the magnetic read/write head surfaces as arc sections of a cylinder and either flattening the filmstrip or wrapping or conforming the filmstrip MOF layer over the arc section head surface to provide a line contact of the magnetic head gap with the MOF layer. Pressure pad supports or rollers on the emulsion side opposite from the recording heads and continuous motion of the film are taught to provide compliance for recording and/or reproducing information.

The above-referenced '522 patent discloses a flexible backing member confined in a rigid frame for a read/write head and is suggested for use in both camera and photofinishing applications. In the system disclosed therein, the cross-film curl including the ears at the filmstrip edge regions 10a and 10b is also attempted to be flattened out. In these head suspension and backing support assemblies, the attempt is made to flatten out the cross-film curl as much as possible and to adjust the assemblies to follow the filmstrip edges so that the magnetic heads remain aligned with the tracks.

Returning to FIG. 3, and summarizing the above, when a filmstrip is tensioned lengthwise and is bent around a head contour, the cross-film curl distortion present in planar form is macroscopically removed at the bend except that the ears are now present in the edge regions 10a, 10b. For a typical 100-mil-wide magnetic read/write head to conform to the edge ears of the filmstrip 10, it is necessary to provide a backing pressure on the emulsion side of the filmstrip 10 to force the film to conform to the MOF layer side as described in the above-referenced patents. These systems increase the pressure on the MOF layer and emulsion layers and impart undesirable drag that can negatively affect the ability to maintain the desired steady velocity in photofinishing equipment.

In addition, the total pressure between the magnetic head contour and the MOF layer, as a result of the required back pressure, is such that excessive and uneven wear of the head takes place on the contour. The result is that intimate compliance between the head gap and tracks in the edge regions is nonuniform rendering the system unsuitable for high density recording.

Problems to be Solved by the Invention

The invention is directed to solving the above stated problems of recording and reproducing information on MOF layers of a filmstrip, particularly in filmstrip processing, handling or other apparatus, while avoiding damage to the filmstrip. In addition, is desired to enhance compliance of a magnetic read/write head with an edge track or tracks of a filmstrip MOF layer in the edge regions thereof while minimizing drag and potential scratching.

SUMMARY OF THE INVENTION

It is therefore a primary object of the invention to enhance the compliance of a magnetic read/write head with a filmstrip MOF layer for recording and/or reproducing information accurately in one or more parallel tracks, particularly in the edge tracks in the edge regions thereof.

It is a further object of the invention to provide a simplified edge tracking and head alignment system for magnetic read/write heads of this type with minimal drag imparted on the filmstrip.

These and other objects of the invention are realized in a magnetic read/write head suspension system for recording and/or reproducing information in at least one edge track in a MOF layer side of a filmstrip as the filmstrip is advanced in a transport direction through a film transport path, the filmstrip having an emulsion layer side opposite to the MOF layer side and evidencing a cross-film curvature from the two edge regions thereof and extending through a central image frame region when unrestrained, the system comprising: edge guide means extending a predetermined distance in the film transport path for receiving and guiding the filmstrip edge regions, the edge guide means configured to allow the filmstrip to be unrestrained in the image frame region and to maintain a cross-film curvature such that the edge regions are angled with respect to one another; at least one magnetic head having a magnetic head gap of a magnetic head gap length; and means for mounting the magnetic head in the edge guide means with the magnetic head gap length oriented in alignment with the angle of the edge regions received and guided by the edge guide means for making compliant line contact of the magnetic head gap with the MOF layer side in the edge region without imparting drag on the central region of the filmstrip.

Preferably, the system further comprises a backing support member and means for mounting the backing support member in relation to the magnetic head for making contact with the emulsion layer side of the filmstrip edge region in opposition to the line contact of the magnetic head gap for ensuring line contact compliance of the magnetic head gap with the MOF layer in the edge region.

The edge guide means are also preferably shaped with a channel formed at a channel angle of 20° to 40° transverse to the direction of film transport plane of the filmstrip and separated sufficiently to receive the filmstrip edge region and guide the filmstrip as it is advanced. First and second edge guide means so shaped are preferably provided for receiving and guiding both edges of the filmstrip, and magnetic heads and backing supports are preferably provided in both edge guide means for a specified number of tracks in both edge regions of the filmstrip MOF layer.

Preferably the support members are formed of an elastic, deformable reed-shaped backing member trapped in a cavity of the edge guide means shaped to bend the backer member into an arc and urge the arc shaped backer member out of the cavity and into the channel to bear against the filmstrip emulsion side when the filmstrip edge region is guided through the edge guide means. The cavity is formed to urge the arc shaped backer member at the angle of the channels to make tangential contact with the filmstrip.

Advantages of the Invention

Allowing the filmstrip to maintain the cross-film curvature while being advanced in the film transport direction through the edge guides and orienting the magnetic heads and support members to the angles of the edge regions simplifies conforming the head to the tracks in the edge regions, decreases drag, and minimizes scratching. It is not necessary to confine or otherwise restrain the filmstrip to flatten the edge regions or to wrap the film edge regions around a curved head surface to attain the high compliance required, resulting in a shorter film transport path. The edge distortion problem of prior art approaches is avoided while a larger area of low pressure sliding contact of the head gap length along the edge tracks is attained resulting in even wear across the head.

BRIEF DESCRIPTION OF THE DRAWINGS

These and other objects, advantages and features of the invention will become apparent from the detailed description given hereinafter in relation to the accompanying drawings, in which.

DETAILED DESCRIPTION OF THE PREFERRED EMBODIMENTS

Preferably, the present invention is practiced with a filmstrip having an MOF layer coated as described above, and particularly for recording and/or reproducing only in all (or less than all, when dummy magnetic heads are used) of the film edge tracks. As shown in the above-referenced patents to a greater or lesser degree, the typical prior art practice in this field has been to shape the magnetic record/reproduce heads as arc sections of a cylinder and to wrap or conform the filmstrip MOF layer over the arc section or to straighten the filmstrip as much as possible at the head gap contact line. This bending of the filmstrip is against its normal, unstressed tendency to curl and is not always effective.

The present invention is based on the concept that high compliance of magnetic heads with the edge region tracks C0–C3 can be attained by minimally restraining the unrestrained cross-film curl and orienting the magnetic head gaps and backing supports to effect line contacts in planes tangent to the average cross-film curl in the respective edge regions. The filmstrip 10 shown in FIG. 2 can be constrained along its longitudinal axis in the direction of transport by confining its edge regions 10a and 10b to the average positive tangent angles that they naturally assume with respect to the reference plane X when the filmstrip 10 is unrestrained. The edge region ears depicted in FIG. 3 created by attempting to flatten the filmstrip 10 by one of the above-described techniques are simply avoided.

Figure 4:
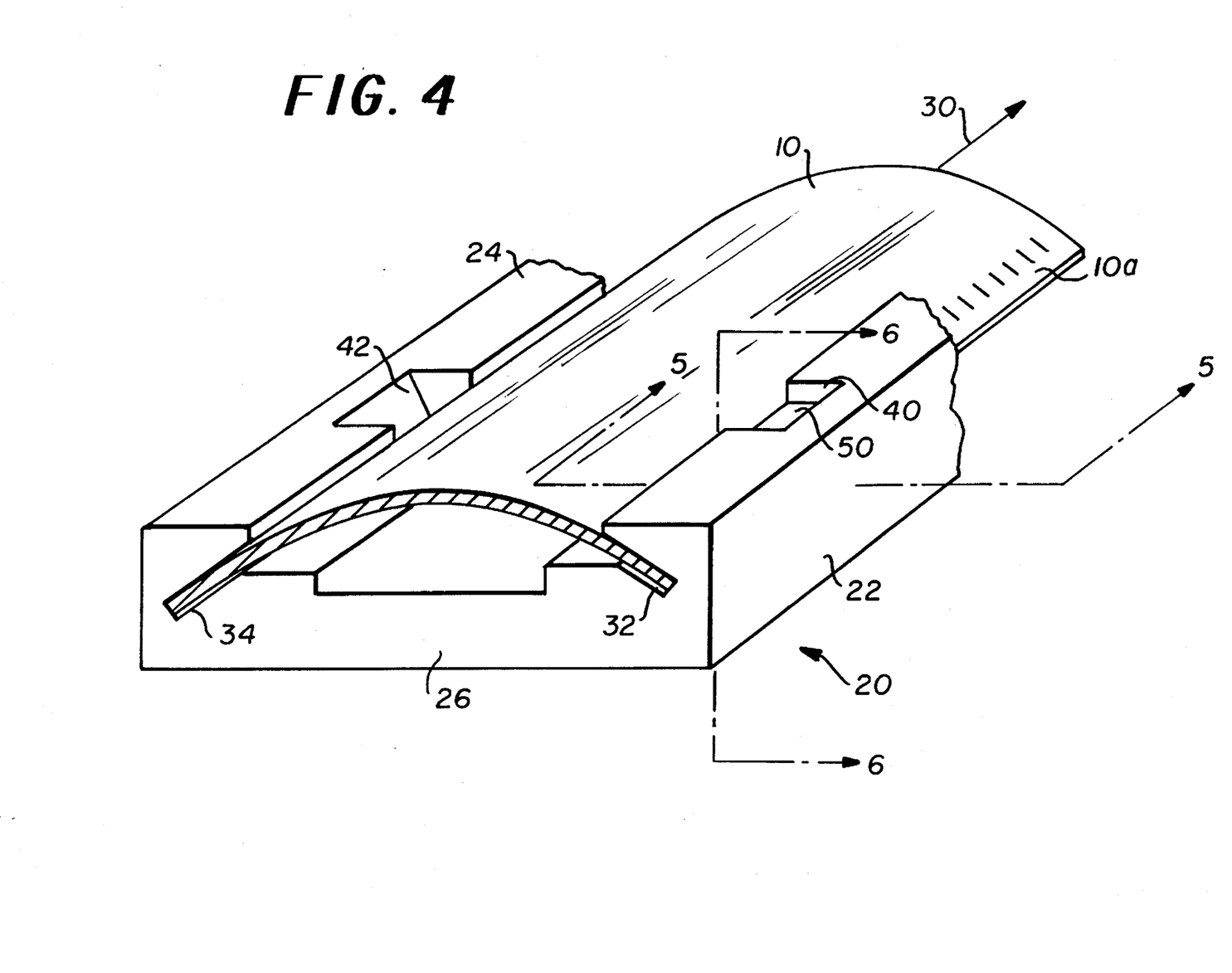
FIG. 4 is a perspective view of a filmstrip guiding and magnetic head suspension assembly of the present invention.

Turning to FIG. 4, a filmstrip guide and head suspension assembly 20 embodying this principle of the invention is schematically depicted for the case of the magnetic layer 15 on the convex side of the filmstrip 10. The edge guides 22 and 24 are formed from base 26 and extend upward and lengthwise in the film transport path 30. The edge guides 22, 24 are configured to allow the filmstrip 10 to be unrestrained in the central image frame region and to maintain a cross-film curvature such that the edge regions 10a and 10b are angled with respect to one another in the angles of the planes A and B. The edge guides 22, 24 are preferably straight and parallel, although they may follow a curve while remaining parallel.

The edge guides 22 and 24 are formed with channels 32 and 34, respectively, extending a predetermined length in the direction of film transport 30. The edge guide channels 32 and 34 are generally oriented to the tangent planes A and B at the cross-film curvatures evidenced in the edge regions 10a and 10b of the filmstrip 10 as shown in FIG. 2. The base 26 is aligned with the reference plane X of FIG. 2. The positive channel angles may be determined from the average value of the tangent plane angles for all conditions of positive cross-film curvature encountered for the filmstrip width, which through empirical measurement is typically in the range of 20°–40° positive with respect to the plane of the base 26 for a filmstrip evidencing the positive cross-film curvature of FIG. 2. The separation distance between the edge guides 22, 24 and the depths of each channel 32, 34 are chosen to accommodate the filmstrip width 10 at the average cross-film curvature. For example, a nominal 30° positive channel angle may be selected and a nominal separation distance may be calculated and used for the intended film size. To the extent that the particular filmstrip exhibits a greater or lesser degree of positive cross-film curvature, it can be accommodated and conformed to the nominal angle without introducing any measurable ears in the edge regions 10a and 10b.

The lead on length into the angled edge guide channels 32, 34 is sufficient to funnel down the filmstrips having greater or lesser degree cross-film curvature into the 30° angle channels. The depths of the channels 32, 34 are selected to encompass the edge regions 10a, 10b between the channel upper and lower surfaces, so that the channel edges do not encroach into the image frame area and a splice may traverse through the gate. The height of the channels 32, 34 is sufficient to allow the filmstrip 10 to traverse through the slots, a value of 0.006 to 0.025 inches (0.015 to 0.125 cm) typically sufficing.

In FIG. 4, first and second head mounting receptacles 40 and 42 are shown for receiving magnetic heads and aligning the head face contours and gaps to the MOF layer tracks C0–C3 in the edge regions 10a and 10b of FIG. 1. The magnetic head 50 and backing assembly 60 are depicted in the sectional views of FIGS. 5 and 6. The magnetic head 50 is mounted or suspended in receptacle 40 so that its head surface contour and head gap slightly penetrates through the upper surface of the channel 32. The head gap length is aligned in the cross-film direction to one of the MOF layer tracks C0 or C1 in the edge region 10a. The alignment is at the selected 30° angle and generally in the tangential plane A of the average unrestrained positive cross-film curl. The magnetic head surface contour is relatively flat, and the penetration minimally distorts the film edge region 10a passing by it.

Figure 5:
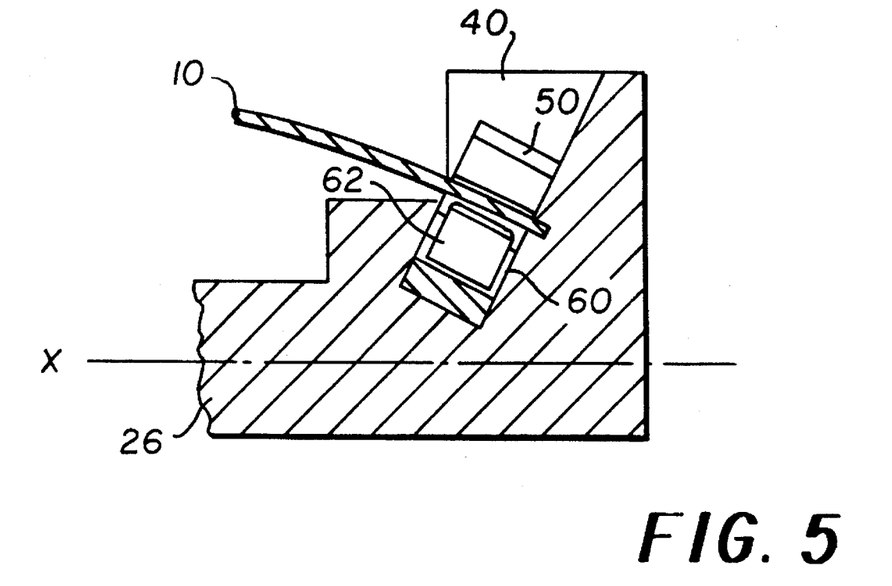
FIG. 5 is a partial cross-section view along lines 5—5 of the assembly of FIG. 4.
Figure 6:
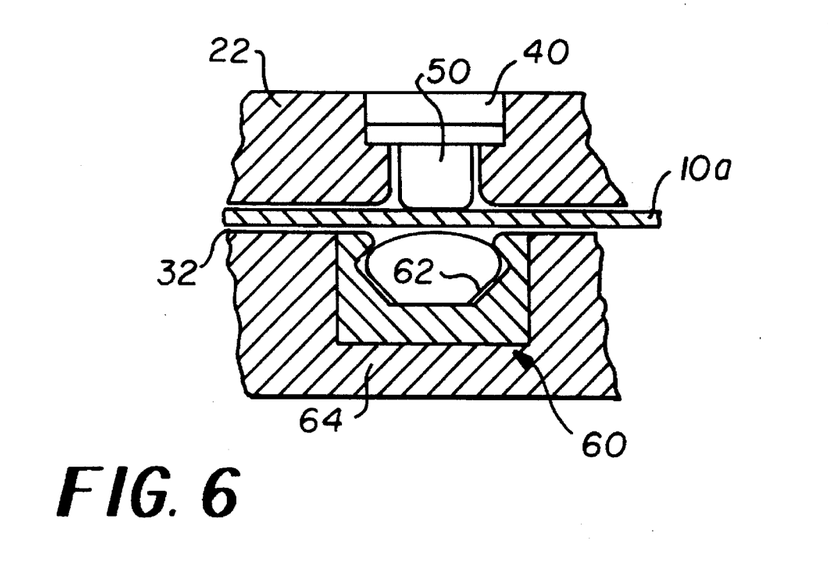
FIG. 6 is a partial cross-section view along lines 6—6 of the assembly of FIG. 4.

The film edge region 10a passing through the channel 32 is pressured on the emulsion side by the backing support assembly 60 so that the particular track C0 or C1 is pressed against the magnetic head gap and contour. The backing support assembly 60 includes a flexible backer member 62 and a support cavity 64 for confining and flexing the backer member 62 so that an arc section thereof slightly penetrates through the lower surface of the channel 32. Preferably, the backer member 62 is formed of an elongated, elastic, deformable reed-shaped backing member bent into a C-shape arc with its ends trapped in the cavity 64. Cavity 64 is shaped to bend the backer member 62 into the C-shape arc and to present the arc section bulging from the opening of the cavity 64. Cavity 64 thereby urges the arc section of the C-shape backer member 62 out of the cavity opening and into the channel 32 to bear against the filmstrip emulsion side when the filmstrip edge region 10a is guided through the channel 32. Tangential contact with the filmstrip edge region 10a is effected opposite to the head gap of magnetic head 50 such that high compliance line contact of the magnetic head gap with the MOF layer track is effected in the edge region 10a. The line contact is effected without having to apply the force necessary to straighten the edge region 10a, since it is already relatively straight, and consequently, minimal tension or drag is imparted to the filmstrip 10 as it is advanced in the direction 30.

As mentioned above, the amount of the cross-film curvature of filmstrips of the type described, and hence the tangent planes to the edge regions 10a, 10b, varies, and the positive angles of the edge channels 32, 34 are chosen as an average. This results in the bending moment on the filmstrip reversing sign in a positive or negative way when the unrestrained filmstrip tangent angles are constrained, resulting in a slight movement positively or negatively of the film edges in the channels 32, 34. This requires that the filmstrip be supported by back pressure applied against the magnetic head contour through the backing support assembly 60 as described above to enable the MOF layer side to comply within a gap spacing in the range of microinches.

Figure 7:
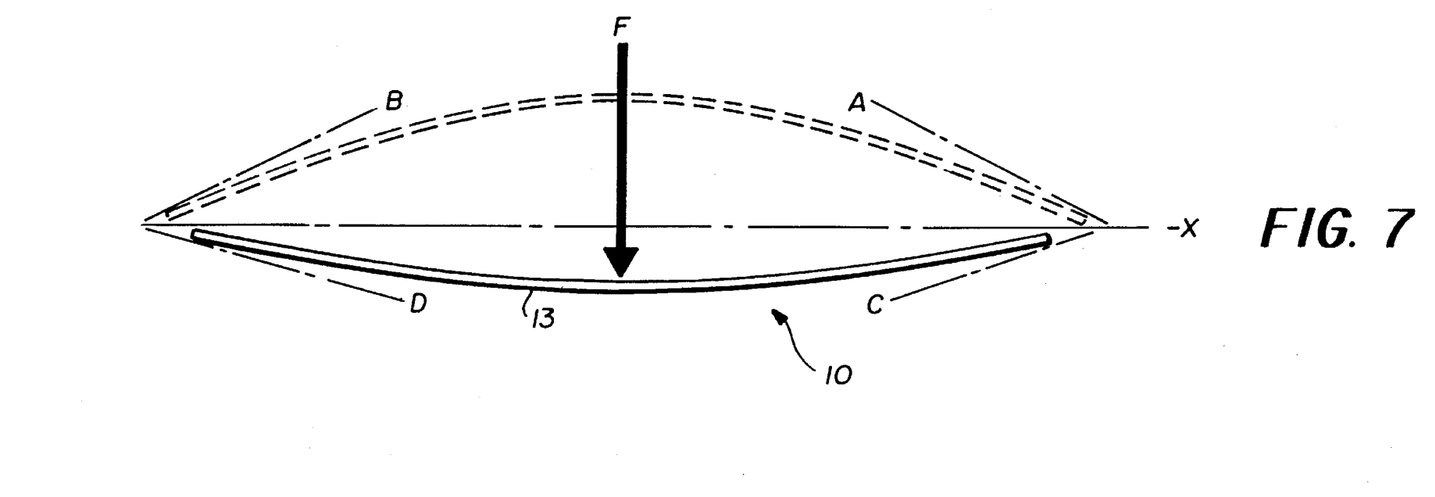
FIG. 7 is a schematic end view of the filmstrip of FIGS. 1 and 2 depicting the reversal to a negative cross-film curvature when the filmstrip is restrained.
Figure 8:
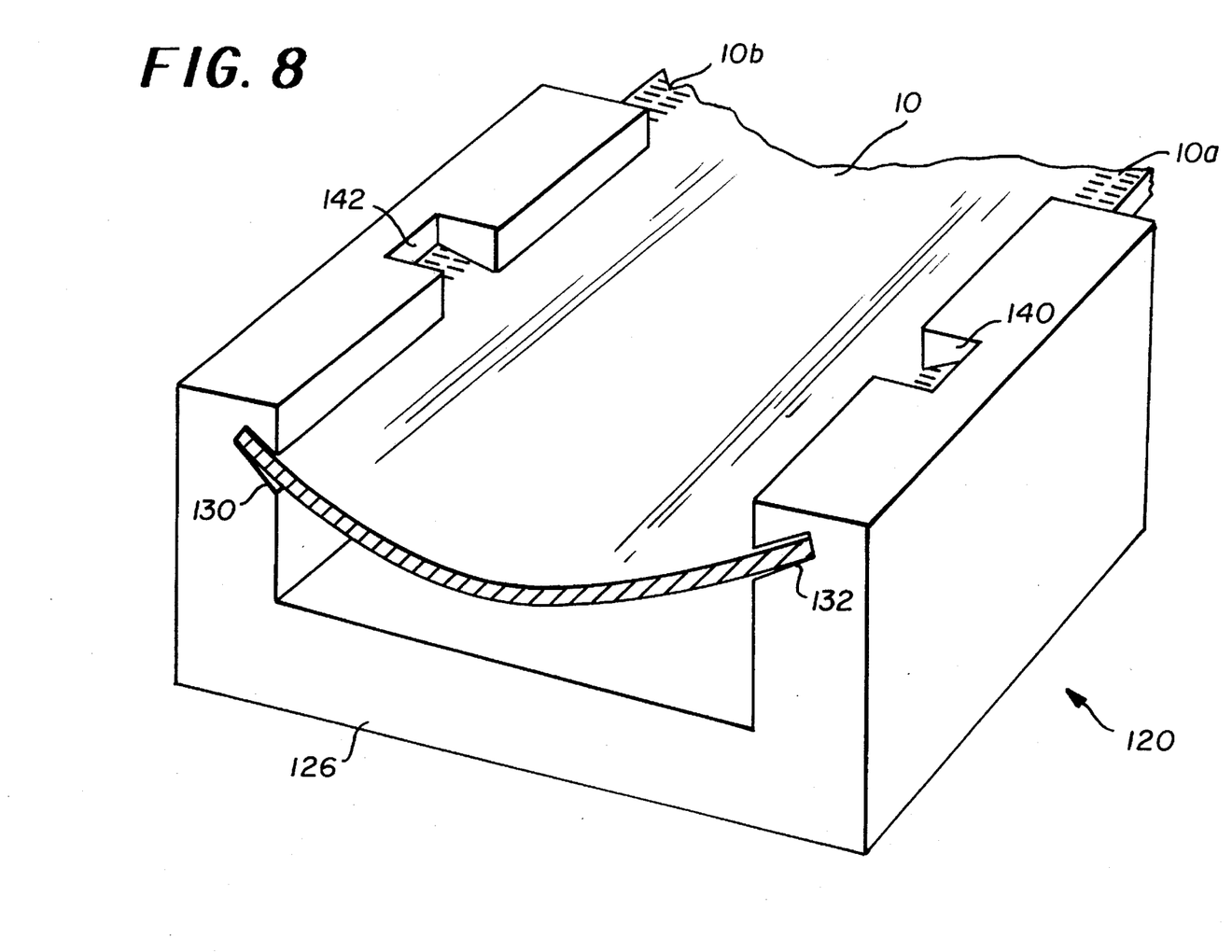
FIG. 8 is a perspective view of an alternative filmstrip guiding and magnetic head suspension assembly of the present invention employing the negative cross-film curvature of FIG. 7.

Turning to FIGS. 7 and 8, an alternative embodiment of the filmstrip guide and head suspension assembly 120 is depicted employing a further characteristic of filmstrips of the type described above. When a filmstrip 10 having positive cross-film curl is restrained along its edges and a deflecting force is applied against the MOF layer side, the cross-film curl can be reversed. The reverse or negative cross-film curl can be maintained by the edge restraint alone when the deflecting force is removed as shown in FIG. 7. The typical negative cross-film curvature tangent planes C and D present negative angles in the edge regions 10a and 10b with respect to the reference plane X that are between 3° and 7° as shown in FIG. 7.

This characteristic can be taken advantage of in the modified assembly 120 where the channels 132, 134 in edge guides 122, 124 are angled at an average selected negative channel angle of about 5° to the reference plane of the base 126. In this embodiment, the edges of the filmstrip 10 are first directed into the funnel-shaped leading ends (not shown) of the channels 132, 134 as the filmstrip central region is deflected by a roller assembly or the like (not shown) from the unrestrained, positive cross-film curvature to the restrained, negative cross-film curvature depicted in FIG. 7. The resulting, stable, negative cross-film curvature is maintained by solely the engagement of the edge regions 10a, 10b within the negative angle channels 132 and 134 of the assembly 120 as also depicted in FIG. 8. The separation between the channels 132, 134 is selected as above to accommodate the particular film type width and the selected angle ensures that ears do not form in the edge regions 10a and 10b. The edge regions 10a and 10b conform to the tangent planes C and D of FIG. 7.

The filmstrip 10 is advanced through the assembly 120 with the MOF layer side up as in the above described assembly 20 of FIG. 4. The concave, negative bend against the convex positive direction of bend will always induce a spring tension in the filmstrip 10 which forces the edge regions 10a and 10b to move in the same upward direction. As a result, the MOF layer side edge regions 10a and 10b are always inherently sprung against the upper surface of the channels 132, 132 at the inner edges thereof. In this case, the magnetic heads are again mounted in the receptacles 140, 142 in the manner shown and described above with reference to magnetic head 50 and FIGS. 5 and 6. However, because of the upwardly directed tension of the filmstrip 10, there is no need for the backing support assemblies in receptacles 140, 142. It is only necessary to align the head contours and gaps to penetrate into the filmstrip plane that it seeks to occupy within the channels 132, 134. The preferable head contour for this case is that of a prolate ellipsoid or aspheric shape with the long axis aligned to the length direction of the head gap, i.e., transverse to the MOF layer track that it is aligned with in the edge region 10a or 10b.

A drawback of this embodiment involves the bending moment required to impose and maintain the negative cross-film curvature, which results in a higher sliding friction of the edge regions 10a, 10b through the channels 132, 134. The transport system is also more complex as it requires an upstream roller assembly to impose the negative cross-film curvature. In both embodiments, downstream shaping may take place to flatten the filmstrips for scanning or other purposes.

As described above, and depicted in the preferred embodiments, it will be understood that the magnetic head suspension assemblies and backing support assemblies (if necessary) are formed in the same fashion for use in the receptacles 42 and 142 and that two spaced apart receptacles may be provided in each edge guide 22, 24 or 122, 124. It will also be understood that each magnetic head 50 may comprise a pair of miniaturized heads suspended in receptacles 40, 42 and 140, 142 with head gaps spaced apart to be aligned with the track pairs C0, C1 and C2, C3. It will be understood that fewer than four active magnetic head assemblies, may be present. The four (or fewer) active magnetic may be either a read head, a write head or both, depending on the application. Moreover, it will be understood that the invention may be practiced with only one track on either edge region or with more than two tracks in either edge region 10a, 10b with the corresponding number of head assemblies.

While there has been shown what are considered to be the preferred embodiments of the invention, it will be manifest that many changes and modifications may be made therein without departing from the essential spirit of the invention. It is intended, therefore, in the following claims to cover all such changes and modifications as may fall within the true scope of the invention.

PARTS LIST FOR FIGS. 1–7 filmstrip 10
imperforate edge region 10a
perforate edge region 10b
base 11
emulsion layers 13
virtually transparent magnetic layer 15
anti-static and lubricating layer 17
perforations 19
filmstrip guide and head suspension assembly 20
edge guides 22, 24
base 26
film transport path 30
angled edge guide channels 32, 34
head suspension receptacles 40, 42
magnetic head 50
backing support assembly 60
flexible backer member 62
support cavity 64
filmstrip guide and head suspension assembly 120
edge guides 122, 124
base 126 film transport path 130
angled edge guide channels 132, 134
head suspension receptacles 140, 142

We claim:

1. A magnetic read/write head suspension system for recording and/or reproducing information in at least one edge track in a MOF layer side of a filmstrip as said filmstrip is advanced in a transport direction through a film transport path having a reference plane in the direction of movement, the filmstrip having an emulsion layer side opposite to the MOF layer side and evidencing a cross-film curvature from the two edge regions thereof and extending through a central image frame region when unrestrained, said system comprising:

edge guide means extending a predetermined distance in the film transport path for receiving and guiding the filmstrip edge regions, said edge guide means configured to allow said filmstrip to be unrestrained in the image frame region and to maintain a cross-film curvature such that said edge regions are angled with respect to one another at positive angles with respect to said reference plane;

at least one magnetic head having a magnetic head gap of a magnetic head gap length; and means for mounting said magnetic head in said edge guide means with said magnetic head gap length oriented in alignment with the angle of the edge regions received and guided by said edge guide means for making compliant line contact of said magnetic head gap with said MOF layer side in said edge region without imparting drag on the central region of said filmstrip.

2. The system of claim 1 further comprising:

a backing support assembly for each magnetic head including a backing support member and means for mounting said backing support member in relation to said magnetic head for making contact with said emulsion layer side of said filmstrip edge region in opposition to the line contact of the magnetic head gap for ensuring line contact compliance of the magnetic head gap with the MOF layer in the edge region.

3. The system of claim 2 wherein said backer plate assembly further comprises:

a cavity formed in said edge guide means having an opening in association with said magnetic head mounting means;

an elastic, deformable reed-shaped backing member trapped in said cavity and shaped by said cavity into an arc section and urged out of the cavity to bear against the filmstrip emulsion side when the filmstrip edge region is guided through the edge guide means.

4. The system of claim 3 wherein said edge guide means are also preferably each shaped with a channel formed at a positive channel angle of 20° to 40° transverse to the direction of film transport plane of the filmstrip and separated sufficiently to receive said filmstrip edge region and guide the filmstrip as it is advanced.

5. The system of claim 4 wherein said cavity is formed to urge the arc shaped backer member at said angle of said channels to make tangential contact with said filmstrip.

6. The system of claim 1 wherein said first and second edge guide means are preferably provided for receiving and guiding both edges of the filmstrip, and magnetic heads and backing support assemblies are preferably provided in both edge guide means for a specified number of tracks in both edge regions of the filmstrip MOF layer.

7. A magnetic read/write head suspension system for recording and/or reproducing information in at least one edge track in a MOF layer side of a filmstrip as said filmstrip is advanced in a transport direction through a film transport path defining a reference plane, the filmstrip having an emulsion layer side opposite to the MOF layer side and evidencing a positive cross-film curvature from the two edge regions thereof and extending through a central image frame region when unrestrained, said system comprising:

edge guide means extending a predetermined distance in the film transport path for receiving and guiding the filmstrip edge regions, said edge guide means configured to allow said filmstrip to be restrained in a negative cross-film curvature opposite to said positive cross-film curvature such that said edge regions are angled with respect to one another within said edge guide means at negative angles to said reference plane;

at least one magnetic head having a magnetic head gap of a magnetic head gap length; and means for mounting said magnetic head in said edge guide means with said magnetic head gap length oriented in alignment with the angle of the edge regions received and guided by said edge guide means for making compliant line contact of said magnetic head gap with said MOF layer side in said edge region without imparting drag on the central region of said filmstrip.

8. The system of claim 7 wherein said edge guide means are also preferably each shaped with a channel formed at a negative channel angle of 3° to 7° transverse to the direction of film transport plane of the filmstrip and separated sufficiently to receive said filmstrip edge region and guide the filmstrip as it is advanced.

9. The system of claim 7 wherein said first and second edge guide means are preferably provided for receiving and guiding both edges of the filmstrip, and magnetic heads and backing support assemblies are preferably provided in both edge guide means for a specified number of tracks in both edge regions of the filmstrip MOF layer.

10. A magnetic read/write head suspension system for recording and/or reproducing information in at least one edge track in a MOF layer side of a filmstrip as said filmstrip is advanced in a transport direction through a film transport path having a reference plane in the direction of movement, the filmstrip having an emulsion layer side opposite to the MOF layer side and evidencing a cross-film curvature from the two edge regions thereof and extending through a central image frame region, said system comprising:

edge guide means extending a predetermined distance in the film transport path for receiving and guiding the filmstrip edge regions, said edge guide means having first and second parallel channels angled with respect to said reference plane configured to receive said filmstrip edge regions to maintain a cross-film curvature with respect to said reference plane;

at least one magnetic head having a magnetic head gap of a magnetic head gap length; and means for mounting said magnetic head in said edge guide means with said magnetic head gap length oriented in alignment with the angle of the filmstrip edge regions received and guided by said first and second channels for making compliant line contact of said magnetic head gap with said MOF layer side without imparting drag on the central region of said filmstrip.

11. The system of claim 10 wherein said first and second edge guide means are preferably provided for receiving and guiding both edges of the filmstrip, and magnetic heads and backing support assemblies are preferably provided in both edge guide means for a specified number of tracks in both edge regions of the filmstrip MOF layer.

* * * * *